United States Patent [19]

Poland

[11] 4,139,893
[45] Feb. 13, 1979

[54] CALCULATOR PROGRAM SECURITY SYSTEM

[75] Inventor: Sydney W. Poland, Arlington, Tex.

[73] Assignee: Texas Instruments Incorporated, Dallas, Tex.

[21] Appl. No.: 826,789

[22] Filed: Aug. 22, 1977

Related U.S. Application Data

[63] Continuation-in-part of Ser. No. 783,903, Apr. 1, 1977, which is a continuation-in-part of Ser. No. 714,464, Aug. 16, 1976.

[51] Int. Cl.² ............................................. G06F 15/02
[52] U.S. Cl. .................................... 364/706; 364/200
[58] Field of Search ............................... 364/200, 706

[56] References Cited

U.S. PATENT DOCUMENTS 3,859,635  1/1975  Watson et al. ...................... 364/200

Primary Examiner—Jerry Smith
Attorney, Agent, or Firm—Stephen S. Sadacca; Rene' Grossman

[57] ABSTRACT

A calculator program is stored on a magnetic recording medium or in a memory such as a read-only-memory. The program is read into or coupled to a programmable calculator for controlling the programmable calculator. A calculator program security system is provided whereby a security code is stored along with the program. If the security code is set, then the program cannot be examined by an operator of the calculator but the program may still be used to control the calculator. If the security code is not set, the operator may examine the program by using the calculator's learn mode. By setting the security code when the program is first stored on the magnetic recording medium or in the aforementioned memory, a proprietary program may be protected from someone using the programmable calculator to obtain a copy of the proprietary program.

11 Claims, 10 Drawing Figures

| I12 | I11 | I10 | I9 | I8 | I7 | I6 | I5 | I4 | I3 | I2 | I0 | I1 | |
|---|---|---|---|---|---|---|---|---|---|---|---|---|---|
| 0 | 1 | 0 | 1 | 0 | 0 | 0 | 0 | 1 | 1 | 0 | 0 | 0 | LOAD LSD OF KEYBOARD REG WITH R5 (R5 KR) |
| 0 | 1 | 0 | 1 | 0 | 0 | 0 | 0 | 0 | 1 | 0 | 0 | 0 | LOAD R5 WITH LSD OF KEYBOARD REG (KR R5) |
| 0 | 1 | 0 | 1 | 0 | 0 | 0 | 0 | 0 | 1 | 1 | 0 | 0 | LOAD KEYBOARD REG WITH EXT (EXT KR) |
| 0 | 0 | 0 | 0 | 0 | 0 | 0 | 0 | 1 | 0 | 1 | 0 | 1 | PREG |
| 0 | 1 | 0 | 1 | 0 | 0 | 0 | 0 | 0 | 1 | 1 | 1 | 0 | FETCH |
| 0 | 1 | 0 | 1 | 0 | 0 | 0 | 1 | 1 | 1 | 1 | 1 | 0 | FETCH HIGH |
| 0 | 1 | 0 | 1 | 0 | 0 | 0 | 0 | 1 | 1 | 1 | 1 | 0 | LOAD PC |
| 0 | 1 | 0 | 1 | 0 | 0 | 0 | 1 | 0 | 1 | 1 | 1 | 0 | UNLOAD PC |

CALCULATOR PROGRAM SECURITY SYSTEM

This is a continuation-in-part of U.S. patent application Ser. No. 783,903 filed Apr. 1, 1977 which is a continuation-in-part of U.S. patent application Ser. No. 714,464 filed Aug. 16, 1976.

BACKGROUND OF THE INVENTION

This invention relates to security features which may be used in programmable calculators to protect proprietary programs. The proprietary programs may be stored on magnetic tapes or cards or in memories, including read-only-memories.

Disclosed herein is a programmable calculator having a plug-in Read-Only-Memory (ROM) chip for storing high order calculational programs and a magnetic card reader for reading in high order calculational programs on the magnetic cards to a Random Access Memory (RAM) located in the calculator system. The security code system of this invention may be used with (1) the programs stored on the plug-in ROM chip; or (2) the programs loaded into the RAM from magnetic cards; or (3) with the programs on the magnetic cards and in the ROM chips.

Using my invention with the calculator system disclosed herein can provide the operator thereof with a wider selection of programs inasmuch as owners of proprietary programs should be more likely to license calculator users to use such programs if the programs can be protected. Once a proprietary program has been interfaced with or loaded into the calculator (the proprietary program having a set security code associated therewith), the operator may then use the proprietary program to calculate answers for his or her inputted data; however, the operator will be unable to examine the proprietary program. When a non-proprietary program is read in (the security code not being set, of course), then the calculator operator can both run the program and examine the program. Such a non-proprietary program may be examined, for instance, by placing the programmable calculator in its learn mode and single stepping through the program codes comprising the program.

It is one object of this invention to provide a security system for an electronic programmable calculator.

It is another object of this invention that the security system be utilizable with a program read in from an external source, such as a magnetic card and/or a program stored in a read-only-memory, particularly a program stored in a ROM installed in a plug-in module.

It is another object of this invention that the programs loaded or interfaced with the calculator system be provided with a security code indicative of whether the program is proprietary or non-proprietary.

It is still yet another object of this invention that when a proprietary program is loaded or interfaced with the electronic calculator that the program be utilizable by an operator of the electronic calculator but not be examinable by an operator of the calculator.

It is still yet another object of this invention that non-proprietary programs be both utilizable and examinable by an operator of the calculator.

The foregoing objects are achieved as is now described. An electronic programmable calculator having both a learn mode and a run mode is provided with a security system for protecting calculator programs stored in a memory means for storing a calculator program. This memory means may be provided by a ROM chip, a RAM or a magnetic card to tape, for instance. The calculator program preferably includes a plurality of program codes, each program code typically mimicing the depression of a key or group of keys on a calculator keyboard when encountered in a program when the calculator is in its run mode. The memory means also stores a security code which may be set or not set. When set, the security code indicates that the program in the memory means is a proprietary program; when not set, the security code indicates that the program is a non-proprietary program. Programs, including the security code associated therewith, which are stored on a magnetic card or tape are preferably read into a program memory area in the calculator, typically provided by a RAM. Thus, when using magnetic cards or tapes to store programs, the program itself and the associated security code are stored in the calculator. Of course when a ROM is used to store programs and associated security code, it usually is not required to transfer the contents of the ROM to the program memory in order to execute the program or to check the setting of the security code so long as the ROM is coupled to the calculator during program execution. When the operator of the programmable calculator attempts to operate keys which would allow him or her to examine the calculator program, the appropriate security code (either for the magnetic card or the read-only-memory chip, as appropriate) is tested and if the security code is set then such keyboard inputs are ignored.

In the embodiment featuring a magnetic card reader, the keyboard inputs associated with the learn mode of the calculator, that is, keys placing the calculator in its learn mode as well as keys permitting single stepping the program stored in the program memory are disabled when the security code is set. In the disclosed embodiment wherein the memory means is provided by a ROM chip, keyboard inputs which otherwise load the program stored in the ROM into the program memory are ignored. Of course, in other embodiments, it may be preferable to permit the program to be loaded from the ROM chip to the calculator's program memory and then disable keyboard inputs associated with the calculator's learn mode.

BRIEF DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the drawings, wherein:

FIG. 2 is a simplified block diagram of a multi-chip calculator system which may be utilized in practicing the present invention;

FIGS. 3a–3b are detailed block diagrams of the arithmetic chip featured in FIG. 2;

FIG. 4 is a detailed block diagram of the SCOM chip featured in FIG. 2;

FIGS. 5a–5e depict in representative form the instruction words decoded by the arithmetic and SCOM chips;

FIG. 5f depicts the originization of the EXT signal;

FIG. 5g depicts the first ROM address as stored in the address register;

FIGS. 6a–6b are timing diagrams showing the timing of various parts of the multi-chip system;

FIGS. 8a–8d are a composite schematic diagram of the arithmetic chip of FIG. 2;

FIGS. 9a–9e are a composite schematic diagram of the SCOM chip of FIG. 2;

FIGS. 10a–10r are schematics of certain circuits used in FIGS. 8a–8d and 9a–9e;

FIG. 17 is a block diagram of the second ROM chip;

FIGS. 18a–18i form a composite schematic diagram of the second ROM chip; and

LOCATION OF THE DRAWINGS

FIGS. 1, 5h, 7 11–16 and 19 accompany this patent. FIGS. 2, 3a–3b, 4, 5a–5g, 6a–6b, 8a–8d, 9a–9e and 10a–10r are hereby incorporated by reference to U.S. Pat. No. 3,900,722, entitled "Multi-Chip Calculator System Having Cycle and Subcycle Timing Generators", which issued on Aug. 19, 1975 to Micheal J. Cochran and Charles P. Grant, Jr. and which is assigned to the assignee of this invention. FIGS. 17 and 18 are hereby incorporated by reference to U.S. patent application Ser. No. 783,903 filed Apr. 1, 1977.

CONCEPTUAL DESCRIPTION

Figure 1:
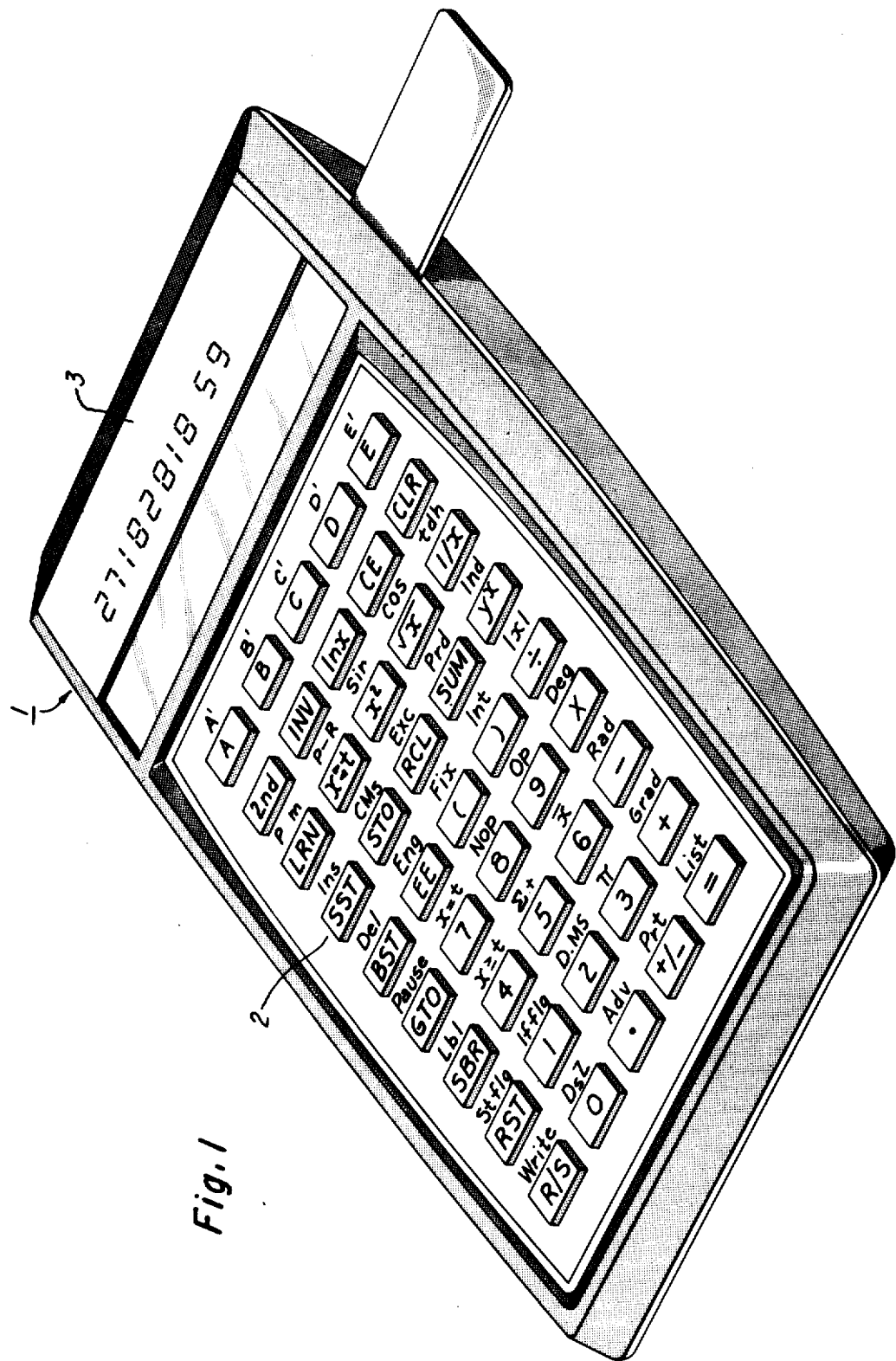
FIG. 1 is a pictorial view of an electronic portable calculator of the type which may embody the invention.
Figures 5H, 7:
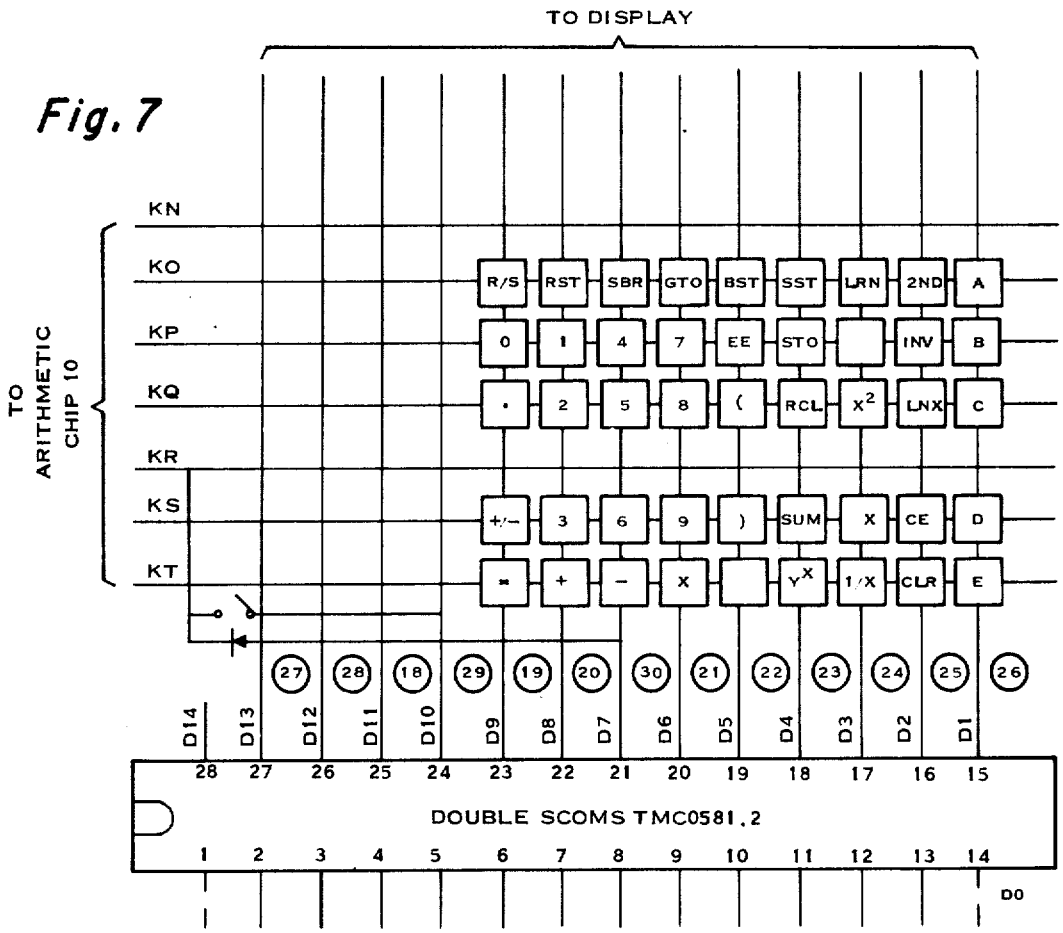
FIG. 5h depicts the instruction words decoded on the second ROM chip and selected instruction words decoded on the arithmetic chip, but which may be conveniently employed in connection with the utilization of second ROM chip.
FIG. 7 is a representation of the keyboard input matrix.

Referring to FIG. 1, an electronic portable calculator of the type which may employ features of this invention is shown in pictorial form. The calculator 1 comprises the keyboard 2 and the display 3. The display 3, in one embodiment, consists of twelve digits or characters, each provided by an array of light emitting diodes, a liquid crystal display, gas discharge tube or other display means. The display is preferably implemented to having eight mantissa digits, two exponent digits, and two character places for negative signs, etc., (one for the mantissa and one for the exponent), thereby permitting outputting the data in scientific notation for instance. Of course, the type of display and the number of digits displayed is a design choice. Ordinarily, the display would be of the seven segment or eight segment variety, with provisions for indicating a decimal point for each digit. The display 2 includes a number of keys (0–9), a decimal point key, the conventional plus (+), minus (−), multiply (×), divide (÷), and equal (=) keys. Further the keyboard preferably includes keys for exponentation ($Y^x$ and inverse $Y^x$) and trigonometric relationships (Sine X, Cosine X, and Tangent X). The calculator is further provided with OP Code keys for performing special functions such as slope, intercept, plotting operations, alphanumeric operations and the like. Further, the calculator may be provided with keys for storing (STO) and recalling (RCL) data from memory, for clearing the calculator (C) and for clearing the last entry (CE). The keys used to access higher order functions will be described subsequently.

Figure 11:
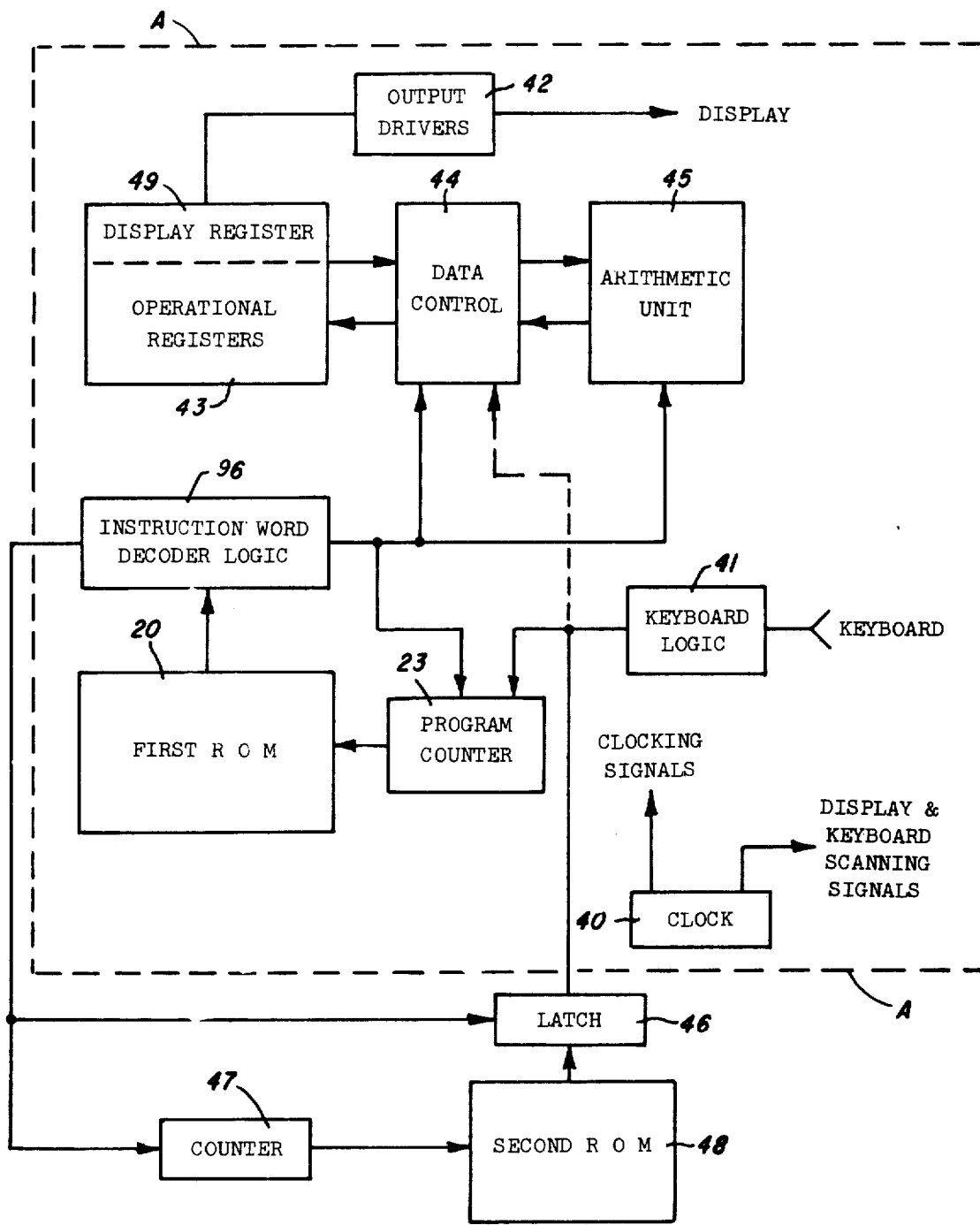
FIG. 11 is a block diagram of a modern electronic calculator equipped with one embodiment of the invention.

In FIG. 11, there is shown in block diagram form, the basic elements of a modern electronic calculator implemented on one or more semiconductor chips. It is to be understood that the block diagram of FIG. 11 is not intended to represent the block diagram of a detailed representation of electronic calculator, but is merely intended to indicate how the additional elements of an electronic calculator system having higher order capability are incorporated into a typical electronic calculator. Subsequently, it will be explained in detail how my invention may be practiced with the multi-chip calculator system depicted in FIGS. 2–19. The calculator of FIG. 11, is shown with a clock 40 which provides clocking signals for transferring data throughout the electronic calculator and provides scanning signals for scanning the display 3 and keyboard 2 or other data entry means. The inputs for the keyboard 2 are provided to keyboard logic 41 which provides an address in response to the depression of a particular key to program counter 23. It should be evident to one skilled in the art that keyboard logic 41, as well as other logic circuitry, may be implemented in the calculator as the elements described or may be implemented as a part of read only memory 20 and instruction word decoder logic 96.

The address received from keyboard logic 41 is inserted into program counter 23 and is utilized in addressing the First Read-Only-Memory (ROM) 20. First ROM 20 contains the microcode for performing basic arithmetic operations and outputs an instruction word in response to the address contained in program counter 23. Program counter typically includes an add-one circuit for incrementing the address in program counter 23. Thus, program counter 23 causes a group of instruction words to be read out of First ROM 20 in response to the incrementing of program counter 23, each instruction word being read out during an instruction cycle. The group of instruction words read out of First ROM 20 corresponds to the address received from keyboard logic 41.

The instruction words read out of First ROM 20 are decoded by instruction word decoded logic 96 to provide instruction commands to program counter 23, arithmetic unit 45 and data control 44. The instruction commands provide to program counter 23 enable branches to be executed by inserting a new address into program counter 23 in response to a branch instruction command stored in First ROM 20. Instruction commands provided to data control 44 and arithmetic unit 45 control the manipulation of numeric data in the calculator. Instruction word decoder 96 is also interconnected with a counter 47 and a latch 46 in my electronic calculator system having higher order math capability.

Data control 44 is interconnected with display register 49, operational registers 43 and with the arithmetic unit 45. Display register 49 stores the number displayed by the display 3 and has associated therewith a plurality of operational registers 43 which are used in conjunction with arithmetic unit 45 to perform arithmetic operations in response to particular instruction commands. Output drivers 42, interconnect display register 49 with a display 3 for decoding the electrical signal, stored in a display register 49 and for driving display 3. Data control 44 comprises a series of selector gates for interconnecting the appropriate operational registers 43 and display register 49 with the arithmetic unit 45, with portions of instruction words, (if need be), or with logic signals from keyboard 2 (if need be).

Numeric data is inputted into display register 49 from keyboard 2 either by a data path from keyboard logic 41 via data control 44 under the control of appropriate instruction commands or by inputting selected portions of an appropriate instruction word in response to selected instruction commands. The electronic calculator system hereinbefore described, that being the portion shown within the reference a dashed line in FIG. 11, basically corresponds to the type of electronic calculators known in the prior art. Exemplary of the prior art calculators systems is the calculator system depicted in FIGS. 2-10.

Also in FIG. 11, there is shown a counter 47 and a latch 46 which is responsive to outputs from instruction word decoder logic 96. The counter 47 has an output for addressing a Second ROM 48. Second ROM 48 outputs a program code in response to the inputted address, the program codes being outputted via latch 46 to program counter 23. When keyboard logic 41 decodes keyboard outputs indicating that a higher order math calculation is to be executed, the higher order math calculation being preferably a series of basis arithmetic functions and operations of the type implemented in first ROM 20, keyboard 41 preferably input an address into program counter 23 which causes First ROM 20 to branch to a location therein for calling a program from Second ROM 48. When a program is called from Second ROM 48, instruction word decoder logic 23 first sets latch 46 to permit the program codes outputted by Second ROM 48 to be inputted into program counter 23. The program codes outputted by Second ROM 48 effectively transmit an address into program counter 23 for addressing First ROM 20. The first such code preferably causes the First ROM 20 to branch to a location for performing the first basic arithmetic operation or function required by the Second ROM 48 program. The program codes may take the same logical format, for instance, as the output from keyboard logic 41. When calling a program from Second ROM 48, instruction word decoder logic 96 also transmits an address into counter 47, the address being the first location in Second ROM 48 of the called program. It should be evident, moreover, that counter 47 could be loaded with an address directly from keyboard logic 41 in lieu of from instruction decoder logic 96, this being essentially a design choice.

After the first program code is read out of Second ROM 48 via latch 46 and loaded into program counter 23 then First ROM 20 cycles through a group of instruction words to accomplish the indicated basic arithmetic operation or function. Of course, the number of instruction cycles required to accomplish the indicated operation or function depends on, for instance, a number of instructions contained for that basic operation or function in First ROM 20. As is well known, those operations or functions which are accessible via keyboard logic 41 from keyboard 2, usually contain instruction words for causing the display to be enabled at the end of the function or operation addressed in First ROM 20. Since, however, another program code is to be read from Second ROM 48 and inserted into program 23 upon accomplishment of the indicated function or operation, counter 47 includes an add-one circuit which is responsive to, for instance, a display command or other such commands located near or at the end of a group of instruction words in First ROM 20 for accomplishing a basic arithmetic operation or a function. When the display command or other such command is decoded by instruction word decoder logic 96, the add-one circuit in counter 47 increments and causes Second ROM 48 to read out the next program code of the called program via the set latch 46 to program counter 23, which in turn causes First ROM 20 to cycle through another group of instructions to accomplish the function or operation indicated by the outputted program code. Again, towards the end of this next basic arithmetic function or operation, a display code or other such code will be decoded in instruction word decoder logic 96 causing the add-one circuit in counter 47 to increment counter 47, the cycle repeating itself.

The advantages of Second ROM 48 and associated counter 47 and latch 45 should be evident to one trained in the art. This system permits equipping an electronic calculator with the capability of performing higher order calculational programs: for instance, changing polar coordinates to rectangular coordinates, doing financial calculations or solving complex engineering equations using significantly less total ROM area than would be required if such programs were implemented only in First ROM 20. Additionally, it should be evident that while the foregoing discussion has suggested that a program code read from Second ROM 48 mimics keyboard logic outputs from keyboard logic 41, the program codes read from Second ROM 48 could, in lieu thereof or in addition thereto, have codes which do not mimic the outputs from keyboard logic 41, but rather, for instance, would cause the program counter 23 to branch to locations in First ROM 20 which are not directly accessible from the keyboard. Thus an output from Second ROM 48 may cause program counter 23 to branch to a location in First ROM 20 which could not be accessed directly from the keyboard 2 via keyboard logic 41. One purpose for such a program code would be a program code in a called program to indicate that the end of the program had been reached. This program code, which I shall refer to as the "return" program code, preferably causes program counter 23 to branch to an address location in First ROM 20 which would contain a group of instructions for resetting latch 46 and for displaying the contents of display register 49. The display instruction preferably follows the reset latch instruction, so that when the display command causes counter 47 to increment (if so used), no branching will occur in response thereto at program counter 23. Also latch 46 inhibits outputs from Second ROM 48 from being inserted into program counter 23 whenever a display instruction or other such instructions is decoded by instruction word decoder logic 96 incrementing the add-one circuit in counter 47 when the calculator has not called a program from Second ROM 48.

Another program code outputted from Second ROM 48 which causes program counter 23 to branch to a location in First ROM 20 which could not be accessed directly from keyboard 2 via keyboard logic 41 is a security program code. As will be seen, the security program code is preferably the first program code read from Second Rom 48 when it is initially addressed. The use of a security program code is particularly useful when the Second ROM 48 and associated circuitry is embodied in a programmable calculator.

In a programmable calculator, there is usually a program memory which can remember or store a sequence of program steps entered from the calculator's keyboard, magnetic cards or magnetic tape. Such a program memory is shown at numerals 14a–14d in FIG. 14 and is discussed with reference thereto.

I have found it advantageous if an entire program can be "down loaded" from the Second ROM 48 into the program memory 14. By "down load" I mean outputting one or more high order calculational programs, each comprising a number of program codes, from ROM 48 and storing the same in the program storage area of memory 14a–14d. The advantage of this is that the "down load" program may then be examined, modified or recorded on magnetic tape or cards by the operator of the programmable calculator, since the downloaded program is then accessible from a volatile memory 14a–14d. Of course, the storage space available in memory 14a–14d may limit the size and complexity of the down loaded program since, in most applications, the number of program steps storable in ROM 48 is likely to be far greater than the number of program steps loadable in memory 14a–14d, as a matter of design choice.

In certain applications this ability to down load a program in Second ROM 48 to program memory 14a–14d may be considered a disadvantage. For instance, if a program is considered to be proprietary, the owner of the program would prefer that a user/licensee of the program not be able to examine or copy the program but merely be able to execute the program. The security program code performs this function, by inhibiting "down loading" in the calculator if the security program code is set. A specific embodiment of the security code program protection in a programmable calculator is subsequently discussed.

As will also be seen, security program code protection may also be provided for programs stored on magnetic cards, whereby the program is loaded into the program memory 14a–14d, but the calculator keys for examining or recording on magnetic cards or tape the program stored therein are disabled when this security code is set.

Figure 12:
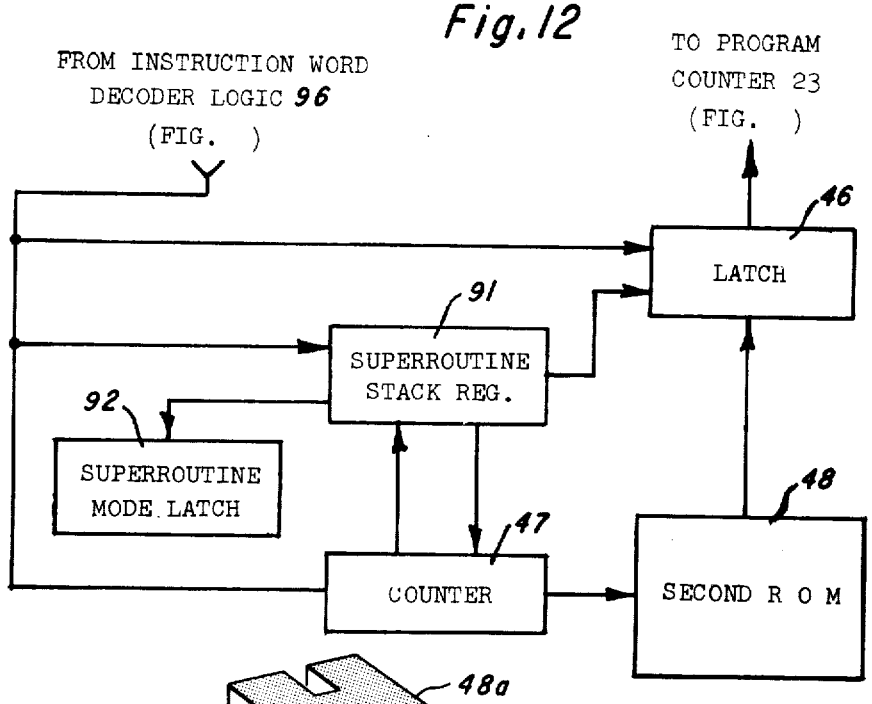
FIG. 12 is a block diagram of another embodiment of the invention which may be utilized with a modern electronic calculator of the type depicted in FIG. 11.

Another embodiment of a calculator employing a Second ROM 48 is shown in FIG. 12 and is discussed with reference thereto in U.S. patent application Ser. No. 783,903 filed Apr. 1, 1977, which is hereby incorporated herein by reference.

Referring now to composite FIGS. 18a–18i, there is shown a detailed logic diagram of second ROM chip 48'. BCD ROM 600 is implemented as a conventional virtual ground type ROM of the type disclosed in U.S. Pat. No. 3,934,233, entitled "Read-Only-Memory For Electronic Calculator", which issued Jan. 20, 1976 and is assigned to the assignee of this invention. Decoders 620 and 621 used in addressing ROM 600 are important features of this invention which permit ROM 600 to be addressed using BCD data without wasted space within ROM 600. The decoders heretofore known in the prior art, such as those exemplified by U.S. Pat. No. 3,934,233, decode either binary, octal, or hexadecimal data, as the case may be. These decoders may be used with a ROM to decode BCD data, of course; however, in that case, large portions of the ROM would go unused inasmuch as hexadecimal numbers 11 through 16 would be decodable, but have no need to be decoded. Using the addressing scheme herein disclosed, permits the addressing of ROM 600 with BCD data without the wasted space within the ROM which would otherwise result with conventional decoders.

ROM 600 is implemented as a 5000×8 bit array for storing 5000 eight bit program codes, the addresses thereof being the BCD encoded numerals 0000–4999. These four numerals are stored in program counter 601. Decoders 620 and 621 are able to decode these 5000 addresses without decoding the non-BCD codes often seen in the binary data contained in a register such as program counter 601.

Figure 13:
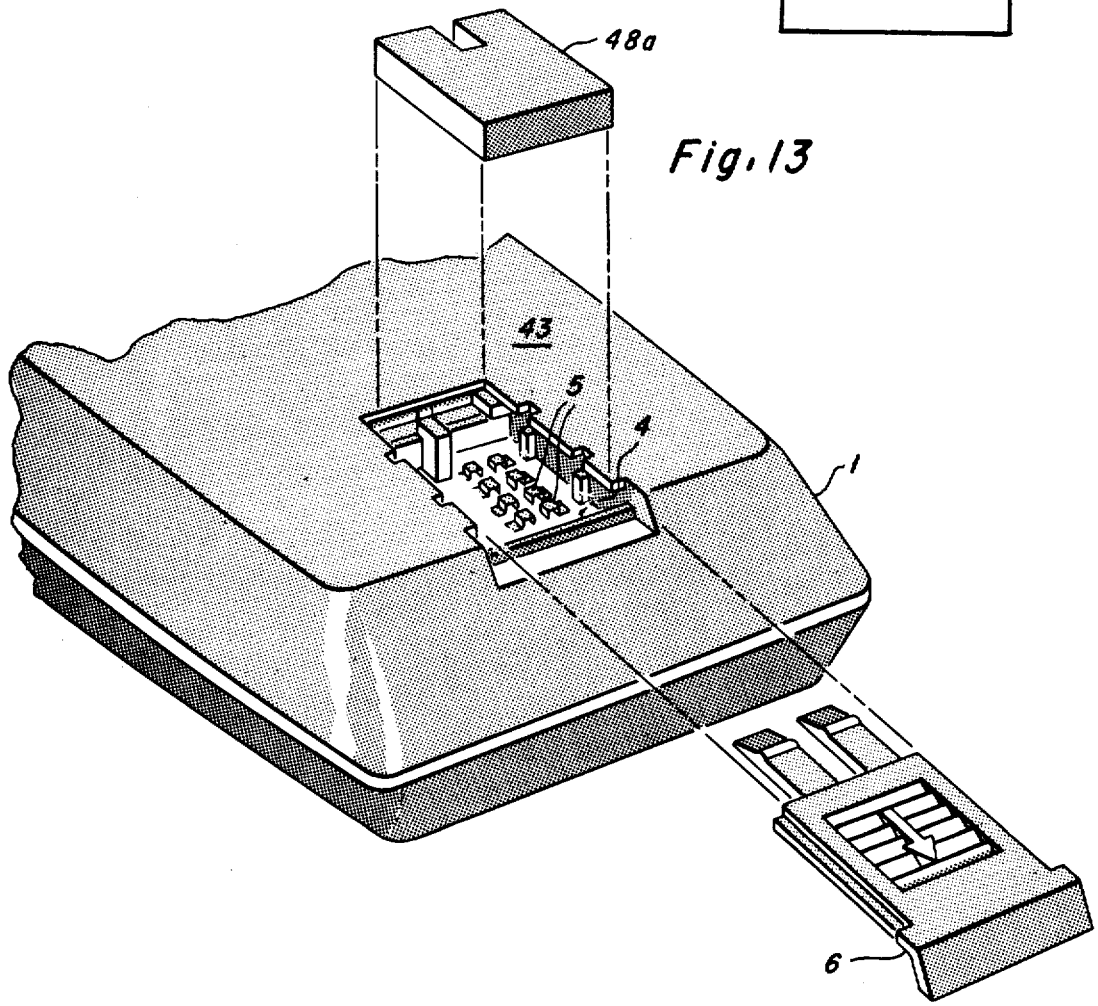
FIG. 13 is a pictorial view of an electronic calculator having an opening for removeably receiving a packaged second ROM chip.

Referring to FIG. 13, there is shown an electronic calculator having an opening 4 for exposing contacts 5, which are connected to the electronics of the calculator. Opening 4 is preferably provided on the rear side of the calculator case 1 as shown in the FIG. 1 and forms, with contact 5, a receptacle for receiving module 48a. Opening 4 is adapted to removably receive the second ROM 48, which is not shown in FIG. 13, but which is disposed in module 48a. Second ROM chip module 48a has contacts (not shown) which mate with contacts 5 for connecting the second ROM 48 therein to the electronic calculator. Door 6 may be closed to retain module 48a in opening 4 during normal operation.

THE SPECIFIC EMBODIMENT IN A PROGRAMMABLE CALCULATOR

Having described how the second ROM is advantageously used with an electronic calculator, a particular embodiment of the second ROM in a particular calculator is now described.

Figure 14:
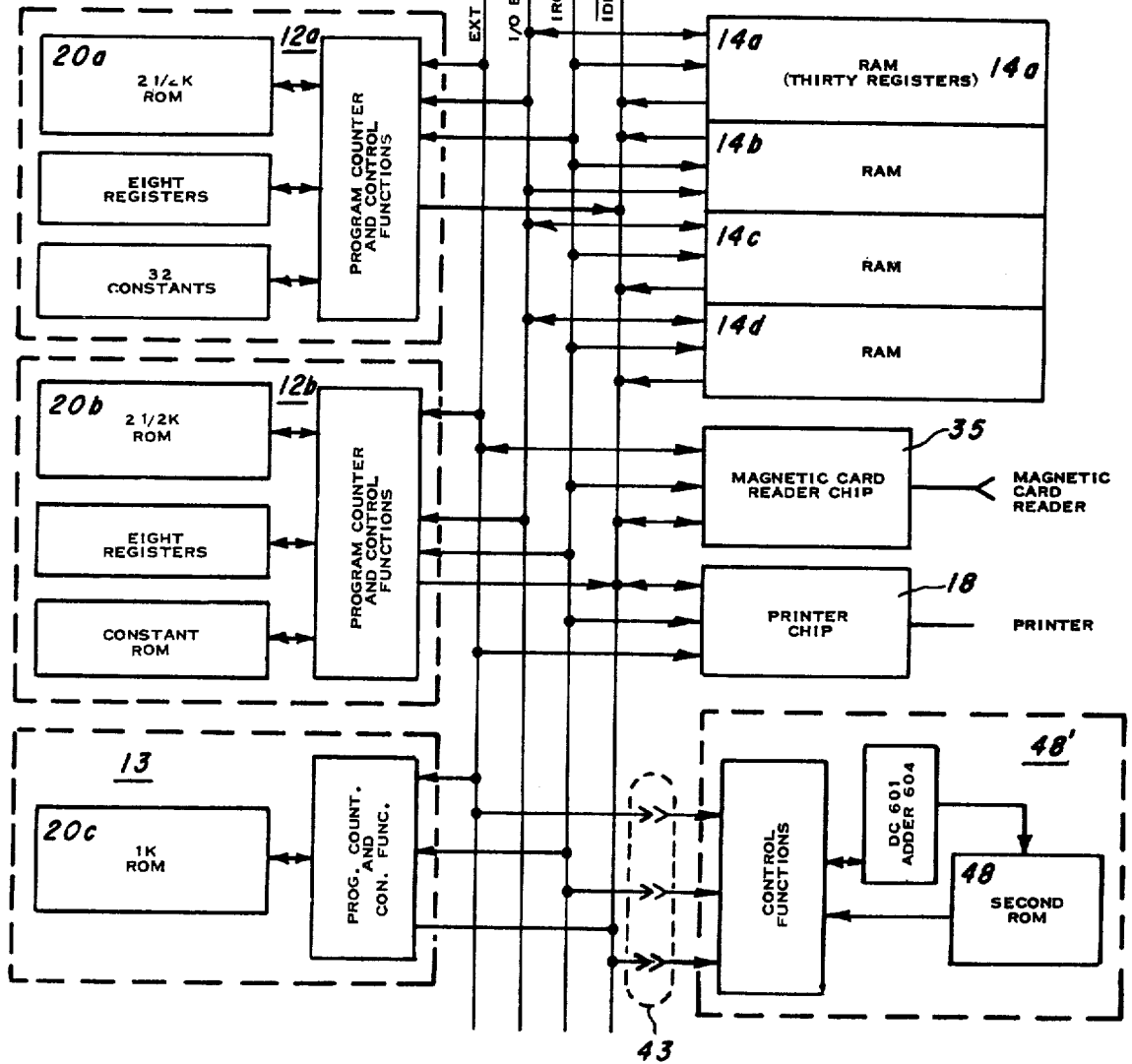
FIG. 14 is a simplified block diagram of a multi-chip calculator system utilizing the present invention.

Referring now to FIG. 14, there is shown a detailed block diagram of an specific embodiment of a programmable electronic calculator employing the second ROM 48 of this invention. In FIG. 14, there is shown a plurality of chips (48', 10, 12a, 12b, 13, 14a–d and 35). Chips 10, 12a, 12b, 13, and 35 have heretofore been described in some detail in prior U.S. Patents and Patent Applications and therefore reference will be made to U.S. Patents or U.S. Patent Applications, as the case may be, for a detailed description of these chips. The following discussion will basicly relate to how chips 10, 12a, 12b and 13 cooperate with a second ROM chip 48'; which is hereafter in detail, to implement a calculator having high order capability.

The calculator's arithmetic chip 10 has a plurality of Registers 50a–50e for storing numeric data, an Arithmetic Unit 55 for performing arithmetic operations on the data stored in Registers 50a–e, Flag Registers 53a–b for storing a plurality of flags, a keyboard register 54 which is (1) loadable with a decoded keyboard address derived from the calculator's keyboard, (2) loadable from a subroutine register or (3) loadable from the second ROM chip 48'. Arithmetic chip 10 is described in detail in aforementioned U.S. Pat. No. 3,900,722 which issued to Michael J. Cochran and Charles P. Grant, Jr. on Aug. 19, 1975 and which is assigned to the assignee of this invention. Line 21, column 4 through line 31, column 44 of U.S. Pat. No. 3,900,722 is hereby incorporated herein by reference.

U.S. Pat. No. 3,900,722 discloses a multiple chip calculator system employing the aforementioned arithmetic chip 10 and a scanning and read-only-memory (SCOM) chip. U.S. Pat. No. 3,900,722 discloses that eight SCOM chips may be utilized in a single calculator system. Referring again to FIG. 14, chips 12a and 12b are each double SCOM chips; a double SCOM chip is the equivalent to two SCOM chips of the type disclosed in U.S. Pat. No. 3,900,722 implemented on a single chip of silicon, with the F and G registers thereof replaced by a single eight register memory of the type disclosed in U.S. Patent Application Ser. No. 745,157 which was filed Nov. 26, 1976 and which is assigned to the assignee of this invention.

External ROM chip 13 provides for increased instruction word storage capacity. The ROMs 20a and 20b on double SCOM chips 12a and 12b and the ROM 20c on chip 13 provide the first ROM 20 for storing the microcode which controls the operation of the calculator system. The microcode stored in ROM's 20a-20c is listed in Tables IIa-IIc, respectively, which are hereby incorporated by reference to U.S. patent application Ser. No. 783,903, filed Apr. 1, 1977. Rom 20c is a 1K × 13 bit ROM while ROMs 20a-20b are each 2.5K × 13 bit ROMs.

Referring briefly to Tables IIa-IIc, the first column thereof is the hexidecimal address of the microcode instruction word appearing in the third column. The second column identifies the chip in which the microcode is stored. TMC-582 and TMC-583 are the two double SCOM chips 12a and 12b; TMC-571 is the external ROM chip 13. The fourth through 19th columns contain instruction words whose addresses are incremented by one for each column, reading from left to right. Thus, in Table IIa, the 17 instruction words in the first row, columns three through 19 are located at hexidecimal addresses 0000 through 0010. The instruction words are in hexidecimal format also and correspond to the instruction words identified in FIGS. 5a-5h.

As explained in U.S. Pat. No. 3,900,722, the arithmetic chip 10 and the double SCOM chips 12a and 12b are interconnected by lines for exchanging the following control signals: external (EXT), input/output (I/O), instruction words (IRG), and IDLE. External is a serial data channel which may be used, for instance, for addressing ROMs 20a-20c using an address stored in the keyboard register 54 when the PREG bit thereof is a logical one or for inputting or outputting serial data depending on the instruction word outputted on IRG (when the PREG bit is a logical zero). I/O is a four bit parallel data channel for transferring data in bit parallel, digit serial fashion under control of construction words outputted from ROMs 20a-20c. IRG is a serial channel for transmitting the instruction word from the particular ROM 20a-20c controlling the operation of the system.

In FIG. 14, there are shown four multi-register chips 14a-14d which are connected to the I/O, IRG, and IDLE lines. These multi-register chips are essentially random access memory (RAM) chips which are utilized for storing the data used by the calculator system and programs entered from the keyboard or from magnetic cards or "down loaded" from Second ROM 48'.

The magnetic card reader chip 35 is responsive to EXT, IRG and IDLE for inputting digital information to the calculator system from magnetic cards or outputting digital information from the calculator system to magnetic cards. Chip 35 is described in greater detail in U.S. patent application Ser. No. 622,288 filed Oct. 10, 1975 now U.S. Pat. No. 4,006,455. Of course, the use of a card reader is a design choice. If chip 35 is not utilized, the diode and switch 7 shown in FIG. 7 should be omitted. Switch 7 closes in response to a card being inserted into the card reading mechanism associated with chip 35.

Printer chip 18 may be used to provide the calculator of this invention with printing capability. It should be evident that the utilization of printer chip 18 is a design choice and further this chip may be either permanently installed in a printer calculator or may be installed in a print cradle, such as the PC 100a cradle manufactured by Texas Instruments Incorporated of Dallas, Tex. which print cradle may be interfaced with a handheld calculator provided with printing capability. Chip 18 is described in greater detail in U.S. patent application Ser. No. 428,492 filed Dec. 26, 1973 now U.S. Pat. No. 4,020,465.

The second ROM chip 48' is interconnected with the calculator system via external, IRG and IDLE. Chip 48' includes a second ROM 48 of the type heretofore discussed plus various control circuits for interfacing it with the render of the calculator system disclosed. As previously mentioned, second ROM chip 48' is preferably removable from the calculator of this invention and therefore a plug assembly 43 is provided for ease of removal and insertion. Preferably, the calculator of this invention is provided with a plurality of such second ROM chips 48', at least any one of which may be connected into the calculator system at any given time. This plurality of ROM chips 48' are programmed to provide different types of problem solving capabilities. For instance, one chip 48' might be implemented with programs for solving statistical problems while another might solve financial, surveying, navigation, medical, mechanical or electrical engineering problems, or the like. Moreover, it should become evident to those skilled in the art, that a plurality of such chips 48' might be interfaced with a calculator at one time if such chips were provided with a chip selection means for identifying which second ROM chip 48' is being addressed at any given time. Such chip selection circuits, while not used in the embodiment herein disclosed, are well known in the art.

While the second ROM of this invention is described as a read-only-memory, it should be evident to those skilled in the art that second ROM might be an electrically alterable device, such as an EPROM, or the like. Similarly, a bubble memory or other such non-volatile memory means could also be utilized as a second ROM.

In Table VIII, which is hereby incorporated by reference to U.S. patent application Ser. No. 783,903, filed Apr. 1, 1977, there is a listing of program codes used in a general purpose Second Rom Chip 48' to perform such operations as: performing a diagnostic checks, complex math operations, matrix math operations, matrix inversion, annuity and compound interest operations, permutation and combination calculations and the like. The program codes are listed in columns 3-19 of Table VIII. The address of the program code in column three is given in column one and the addresses of the other program codes on the same line increment by one for each column reading from left to right.

ORGANIZATION OF PROGRAMS STORED IN THE SECOND ROM

As it has been previously discussed, the second ROM stores a plurality of program codes for performing high order functions. The organization of these program codes on chip 48' is now described in detail. In this embodiment, the program codes comprise a pair of four bit binary coded decimal (BCD) digits. Therefore, these codes may be any number between 00 and 99.

Figure 15:
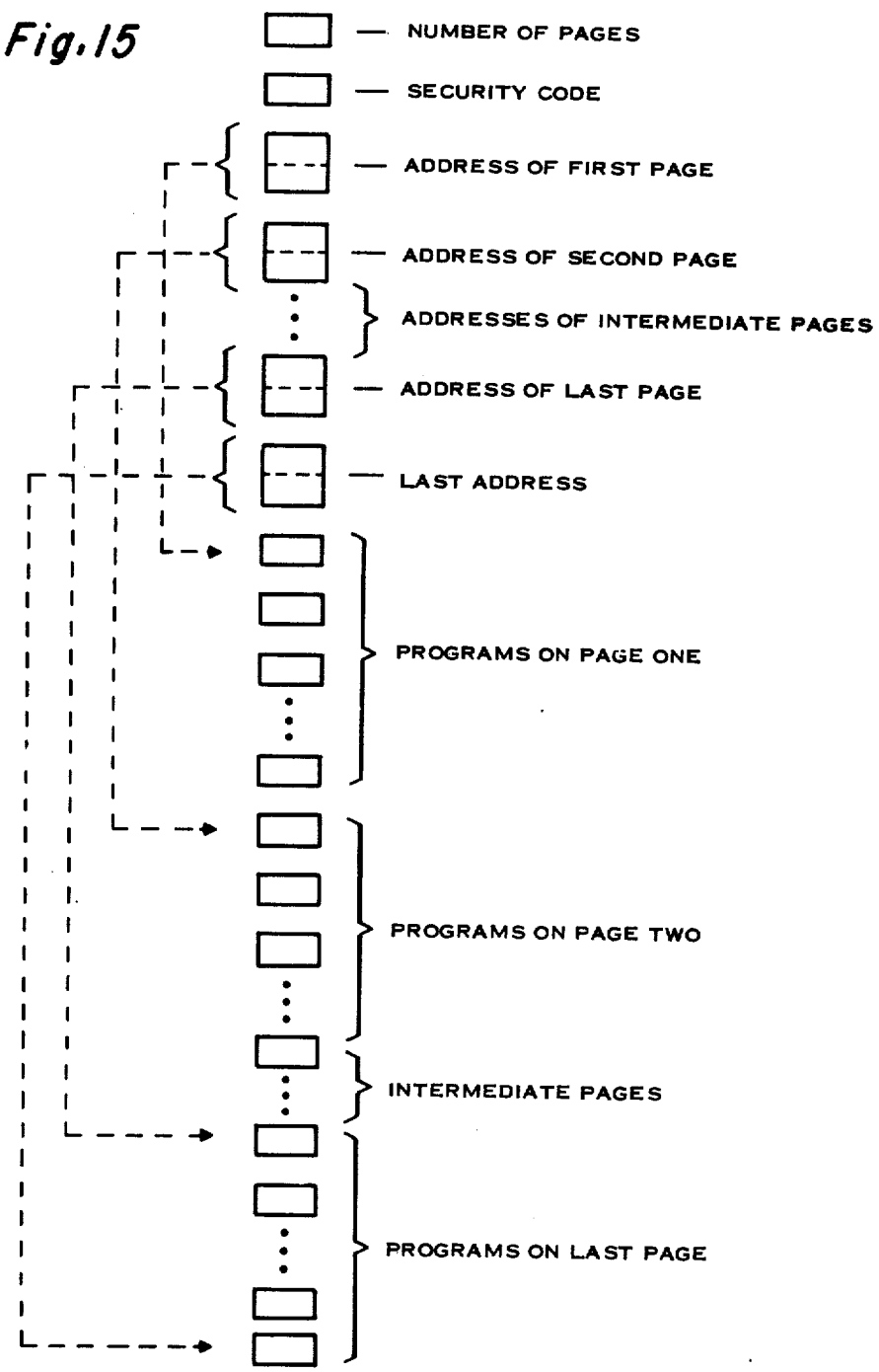
FIG. 15 is a function diagram of the logical organization of data stored in the second ROM.
Figure 16:
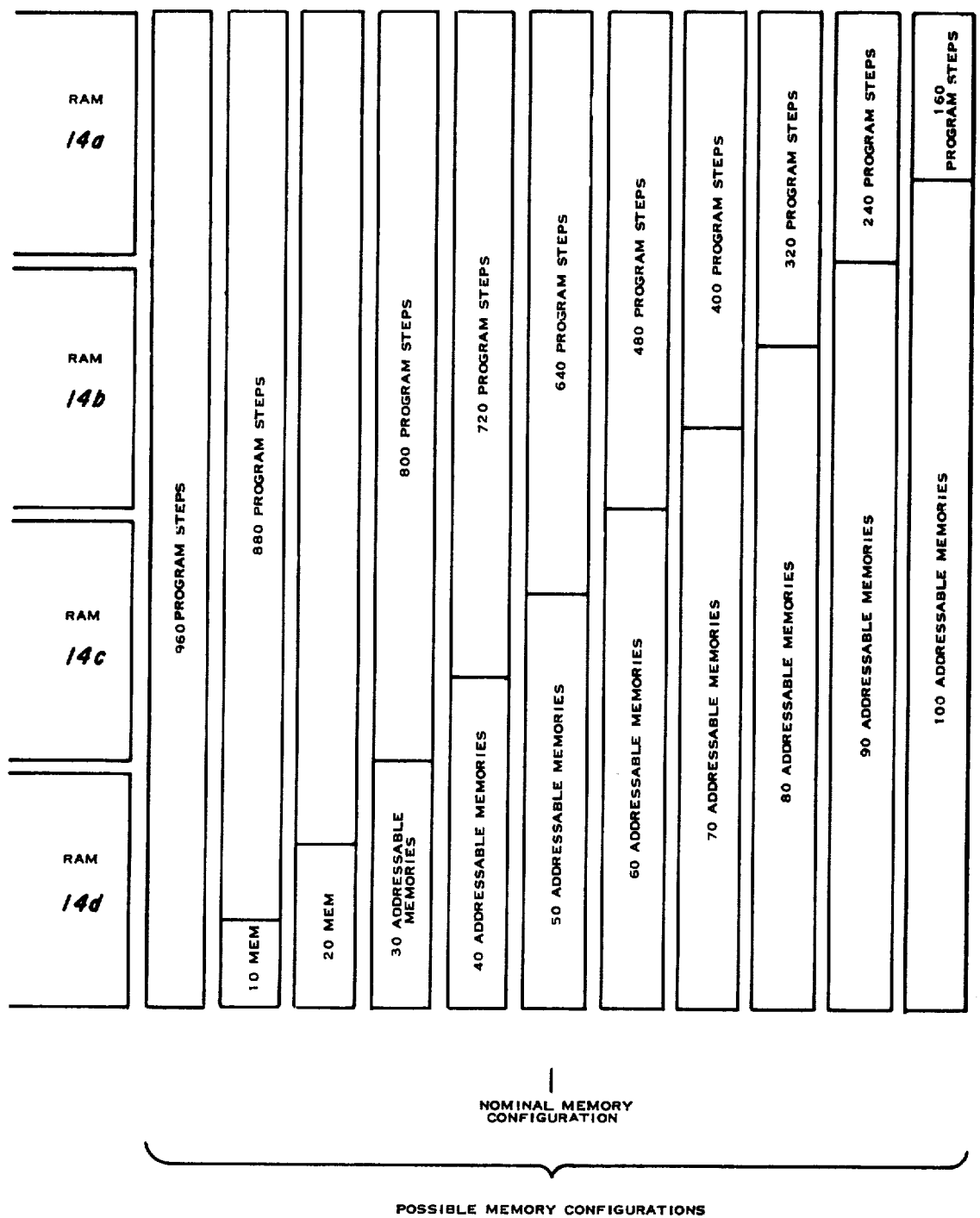
FIG. 16 depicts the variable boundary between data and program steps in the calculator's memory.

Referring now to FIG. 15, there is shown a functional diagram of how the program codes are organized on the second ROM of chip 48' and preferably a second ROM implemented in a pluggable package. In this embodiment ROM 48 stores on the order of 5,000 eight bit program codes. Referring now to FIG. 15, a rectangle thereon represents an eight bit code outputtable from ROM 48 in response to an address. Second ROM 48 stores a plurality of programs, which are for ease of addressing, arranged on "pages". Several programs are preferably allocated to each page. When a program in second ROM 48 is to be accessed from the calculator's keyboard, the operator depresses the "2ND" key and the "program" key (PGM) in this embodiment. The operator next enters a two digit number indicating the page upon which the program he or she wishes to access exists. For instance, if he or she wishes to access a program on page twelve, he or she would depress the one and two number keys. The operator knows upon which page the desired program exists because a program directory is preferably supplied along with a pluggable second ROM chip 48'. The operator then preferably enters a label to uniquely identify the particular program which is desired on the page previously entered. This is done by depressing either a particular label key A-E or A'-E' or the subroutine key (SBR) followed by a non-number key (e.g., SBR, =; or SBR, $X^2$; or the like). Depressing the subroutine key and entering a three digit address preferably causes a branch to the location equal to the sum of the inputted address plus the address of the first program code on the inputted page.

The calculator is preferably permanently programmed to first read out the program code at location 0000 which indicates the number of pages stored on that particular second ROM 48. This number is compared with the inputting page number to assure that the inputted page number exists in second ROM 48. Next the security program code at location 0001 is preferably outputted. The next step is to address second ROM 48 with the entered page location, the address being derived by multiplying the inputted page number by two. For example, if page 02 is entered, then the address to be used is 0004. At address 0004 is a top half of the address (the thousands and hundreds digits) for the beginning point of the second page. At address 0005 is the bottom half of the address (the tens and units digits). The program codes at locations 0004 and 0005 define the address where the second page begins in second ROM 48. Locations 0006 and 0007 will also be read out to provide the address of the beginning point of the third page, which is indicative of the ending point of the programs stored on the second page. Thus the address of the second page derived from locations 0004 and 0005 is used as the starting point for a label search and the address of a third page is used to define the ending point of that search.

The program in second ROM 48 is caused to branch to the program code which occurs at the starting point of page two. At page two in second ROM 48, the label search is commenced by reading out program codes sequentially until either the label being searched for is detected or the beginning point of page three is encountered, indicating that the label being searched for does not exist on the page selected. The label being searched or is either a particular label program code (Table III code 10-19) or the label program code (Table III, code 76) followed by a particular non-numeral program code. When the last page is selected, then the address of the last page, as well as the last address on that page are read out to fulfill the function of reading out the addresses of pages 2 and 3 in the foregoing example. This sequence of events is also diagrammatically depicted in FIG. 15.

Referring now to Table III, there is shown a list of the program codes 00-99 preferably used in the calculator system of this invention along with the corresponding functions performed by these codes and the key sequences used to generate the codes when generated from the keyboard. As can be seen, certain program codes may not be directly generated from the calculator's keyboard. The functions performed by the program codes listed in Table III should be evident to those skilled in the art based on the description set forth in Table III. By way of further clarification, however, the inverse function key (INV) is used to perform the inverse of the function indicated for selected keys. For instance, the inverse function key when combined with the LNx key causes the calculator to taken the number $e^x$ in lieu of taking the natural logorithm of the number x. The indirect addressing key (IND, which must be used in combination with the 2ND key, of course) is used with the memory operation keys and "go to" or "conditional go to" keys (GTO, X=T or X≧T) to indicate that the number following the program code does not describe either the memory used (if a memory operation) or the branching location (if a go to or conditional go to operation), bur rather identifies the particular memory whose contents define either the particular memory to be used (if a memory operation) or the branch address (if a go to type instruction).

Referring again to Table III, program codes 00-09 define the ten numeral keys and the remaining program codes are defined according to the following convention. The first number thereof identifies the keyboard row in which the key is located and the second number defines the keyboard column in which the key is located, for the basic functions which may be accessed by a single key push. For functions accessed by multiple key push sequences, selected merged program codes are utilized. For instance, when the 2ND key is combined with another key to perform the operations indicated, the number 5 is added to the basic program code (without a carry) to generate the merged program code. Thus, for example, the label A is stored as a program code "11" whereas the label A', which requires the 2ND key to be actuated before the A key, is stored as program code "16". Program codes which otherwise would define those keys performing the numeral functions (eg, 0-9), are reversed for selected merged program codes or for program code not directly generated at the keyboard. For example, program codes 62, 63, 64, 72, 73, 74, 83 and 84 are used for merged program codes wherein the IND key is used. Program codes 82 and 92, which are not defined according to the foregoing convention, define a hierarchy address function and the "return" function. The "return" function has already been mentioned and the hierarchy address function is used to address the eight registers on one of the double SCOM chips, which are set aside for hierarchy control purposes. This calculator system utilizes the algebraic operating system disclosed in U.S. Patent Application Ser. No. 708,958 filed July 26, 1976, for hierarchy control purposes. The hierarchy address code (82) is followed by another program code to define the hierarchy register and operation involved or to define a conditional return, whose function will be mentioned later. The meaning of the program code following the hierarchy address code is set forth in Table IV.

The use of such codes which are not directly accessible from the keyboard permit the accomplishment of special functions or entry in to date areas which are normally isolated from the operator.

The operation code (OP) is used with a following program code for calling the special functions identified in Table V. These routines ae implemented in this calculator either in microcode alone or by using second ROM adressing techniques. The second ROM area for such operation code functions is located in the constant ROM areas of double SCOM chips 12a and 12b. Approximately half of the constant ROM in double SCOM chip 12a is used for storing constants in the manner contemplated by U.S. Pat. No. 3,900,722 while the other half of that constant ROM and all of the constant ROM in double SCOM 12b is used for storing program codes, as defined in Table III, in the manner generally set forth in U.S. patent application Ser. No. 714,464, filed Aug. 16, 1976. The contents of the constant ROMs are listed in Table III hereof. Eight two digit program codes are stored in each constant storage area in the constant ROMs. The codes are stored from right to left; thus, the first program code in constant area sixteen is an 82. The addresses of these program codes for discussion purposes will be: Constant number hyphen one of eight locations. Thus, the address of the first program code on constant area sixteen (82) is 16-0, while the third program code in constant area eighteen (43) is 18-2. Locations 16-0 through 24-2 contain a slope-intercept routine. The other routines in the constant ROM area are defined in Table VIa. As can be seen, the functions stored in the constant ROM areas are recessed either by OP codes or by normal keyboard entries; for example, the polar to rectangular conversion function is stored in the constant ROM areas and is accessed by depressing the P→R key on the keyboard.

The program codes in Table VI make use of the conditional return program code (82 followed by 20). The conditional return evokes a return function only when all the program codes for the accessed function have been read out. For instance, if the variance is being calculated, the conditional return stored at locations 26-2 and 26-3 is ignored so that after having found the mean according to the program codes at locations 24-3 through 29-2 is performed. The hierarchy address function (program codes 82,—), used with several routines to address the hierarchy registers in order to maximize the addressable storage area available in RAM chips 14a-14d.

STORING A KEYED-IN PROGRAM/PROGRAM MEMORY PARTITIONING

When the operator desires to utilize his or her own program in lieu of a program stored in the first or second ROM's, he or she may do so by an appropriate key sequence for storing keyboard enterable program codes of Table III in RAMs 14a-14d. RAMs 14a-14d may also be used for storage of numeric data, i.e., the results of the calculations performed by this electronic calculator. Normally, RAMs 14a-14d provide a storage for storing 480 program codes while RAMs 14c and 14d provide 60 addressable memory locations for storing numeric data. By depressing 2ND, OP, 1, 6, the operator may determine which data configuration RAMs 14a-14d are in; in this case, the number 479.59 would be outputted. The number to the left of the decimal point is the maximum address in RAMs 14a-14d for program steps, while the number to the right is the maximum address in RAMs 14a-14d of memory registers.

By inputting a number between one and ten, 2ND, OP, 1, 7; the inputted number is used as the number of decodes of memory registers set aside in RAMs 14a-14d and the resulting configuration is displayed in the aformentioned manner. For example, inputting 7, 2ND, OP, 1, 7 results in RAMs 14a-14d being repartitioned with seventy memory registers and 400 program step locations; also 399.69 would appear in the display.

RAMs 14a-14d can store up to 120 sixteen digit words and can be partitioned to store as many as 960 program codes with no addressable memory registers to as few as 160 program codes with 100 addressable memories in this embodiment. As can be seen from FIG. 16, the addressable memory locations may be traded at the rate of 10 for 80 program step locations when repartitioning takes place. Of course, the precise number of memories as well as the range of possible data configurations is a design choice.

Figure 19:
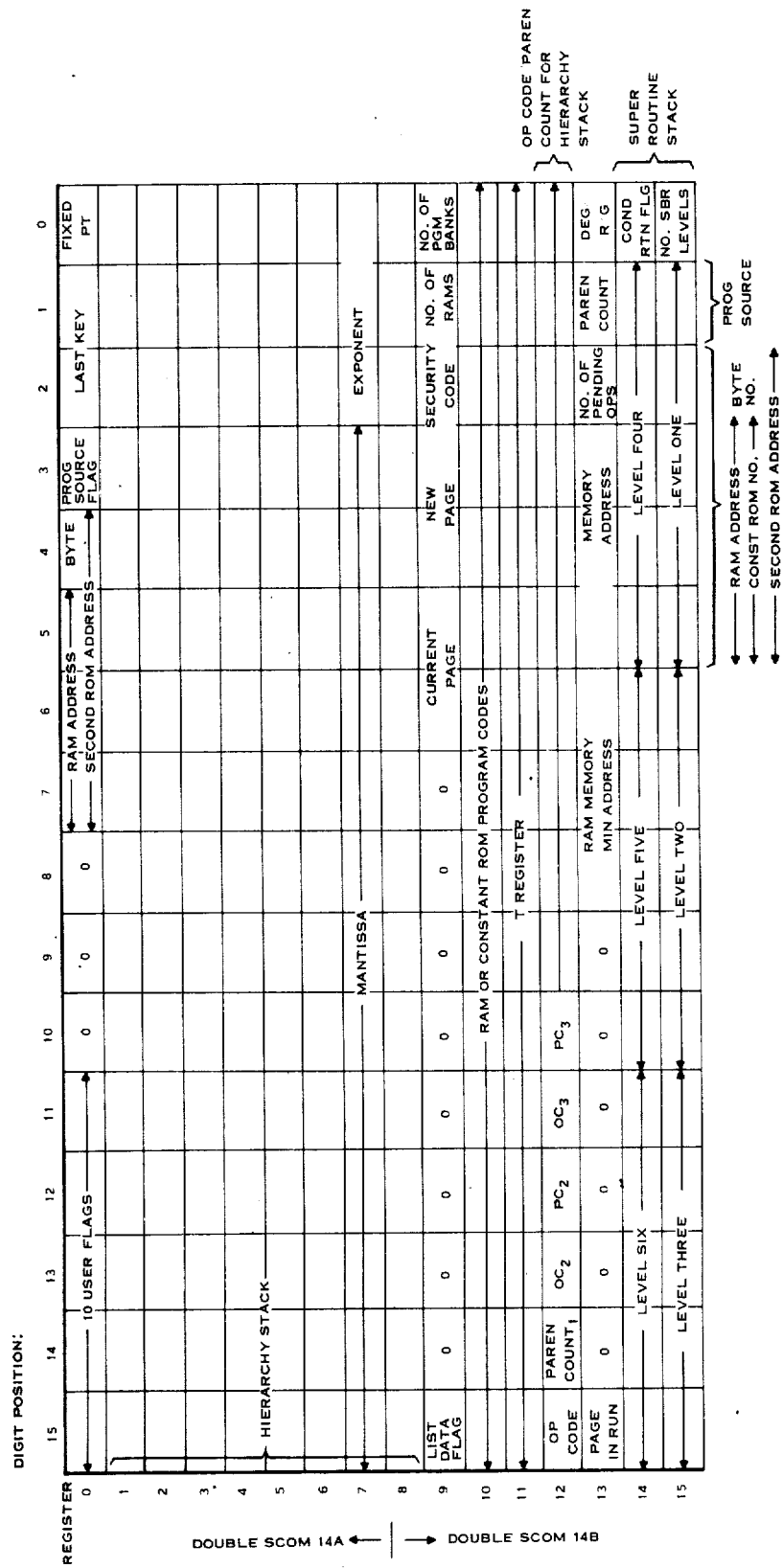
FIG. 19 is a representation of data stored in the memory registers on the double SCOM chips.

The partitioning data is stored in digits 3-8 of register 13 on double SCOM chip 14b (see FIG. 19). Digits 8-6 holds the actual address in RAMs 14a-14d defining the location of memory 00 while digits 5—5 hold the largest number assigned to a memory. Thus, in the normal 479.59 configuration, 048 is stored in digits 8-6 while 059 is stored in digits 5-3. Attempting to branch to a program location equal to or greater than the contents of digits 8-6 causes an error condition, as does addressing a memory greater than the number in digits 5-3 of register 13.

DOWN LOADING A PROGRAM

Referring again briefly to FIG. 14, the down load operational code may be utilized to permit a page in second ROM 48 to be loaded into the program code storage area of RAMs 14a-14d. The security code in the Second ROM 48 to be down loaded must be a 00 to permit the down loading to occur. A 01 security code inhibits the down loading operation, thereby helping to maintain the secrecy of the programs stored in Second ROM 48 should that be desired. If the security code bit is set, then the programs in the Second ROM may be utilized to perform the function indicated but the series of program codes may not be read out of the calculator to the operator. The security code in ROM chip 48' is tested when a "down load" command (OP 09) is inputted at the keyboard, so it is not required that the Second ROM security code be stored in any other memory area within the calculator. After a program is down loaded into RAMs 14a-14d, the operator has free access for examining the program and altering it as he or she sees fit.

LOADING DATA OR A PROGRAM FROM MAGNETIC CARDS

In the embodiment disclosed, the program memory is provided by four RAM chips 14a-14d. As a design choice, the magnetic cards utilized can each store the same amount of data as can be loaded into one of the RAM chips. Of course, one or more magnetic cards could be arranged to store the data for a single RAM program memory, and visa versa, if desired. In this embodiment, each magnetic card (and therefore each RAM chip) stores 240 program codes (or 30 thirteen-digit words of numeric data or a combination of program codes and numeric data). Each magnetic card also stores a program code for identifying (1) the particular RAM chip into which the data stored on the card is to be read and (2) whether the security code is set.

The words of data and/or program codes stored on the magnetic cards are read into the appropriate RAM chip by merely inserting the card through the hole provided therefore on the side of the calculator's case (see FIG. 1) and into the magnetic card reader located behind the hole. Inserting the card causes switch 7 (FIG. 7) to close, which in turn causes the card reader to be energized and prepares the calculator to receive the data.

After reading in the data, a number (1 to 4 in this embodiment) preferably appears in the display indicating (1) a successful read operation and (2) the number of the RAM chip into which the data on the card was read. If a minus sign (−) appears with the number, this indicates that the security bit was set. This bit is stored in the security code area of the constant ROM on double SCOM chip 14b (see FIG. 19).

When the security bit is set, the keys on the calculator associated with accessing or modifying the program in program memory, Learn (LRN), Single Step (SST), Back Step (BST), Insert (INS) and Delete (DEL), among others, are disabled. Thus whenever one of the aforementioned keys is depressed, the calculator first checks the status of the security code in double SCOM chip 14b before executing the inputted instruction (if the security code is not set, of course). Further, when the security bit is set, the contents of the RAM chips cannot be reduced onto another magnetic card.

It can thus be seen that by setting the security bit stored on the magnetic cards or in the Second ROM or in other such means for storing a calculator program, the operator is not permitted to examine or modify the stored program after it is interfaced or loaded into the calculator, but the operator may still use the program to solve a problem. Further, the operator cannot transfer the stored program to magnetic cards.

The ability of an operator to read, load or interface a security bit protected program with an electronic calculator and to be able to execute such programs, but not be able to examine such programs is a novel feature of my invention which increases an operator's accessibility to proprietary programs for the purpose of solving problems. My invention also permits a vendor of proprietary programs to license a calculator operator to use proprietary programs with lessened fear that the licensee will be able to make an unauthorized transfer of the properietary programs to others.

WRITING DATA ON MAGNETIC CARDS

The contents of each RAM 14a–14d may be written onto a magnetic card, provided the security code or double SCOM chip 14b is not set. Writing is accomplished by depressing a number key (1–4, depending on the particular Ram 14a–14d to be written from), the 2ND, WRITE and then by inserting a magnetic card into the card reader mechanism through the hole in the side of the calculator's case. Writing a program onto a card thusly will automatically record the security code as not being set (i.e., a non-proprietary program). The security code may be set during writing by depressing the minus sign key after the number key and before the 2ND key.

SECOND ROM CHIP DETAILS

FIG. 17 is a block diagram of Second ROM chip 48′ while FIGS. 18a–18i form a composite logic diagram of Second ROM chip 48′. FIGS. 17 and 18a–18i and the discussion pertaining thereto are incorporated by reference to U.S. patent application Ser. No. 783,903 filed Apr. 1, 1977.

Referring now briefly to FIG. 19, there is set out the utilization of the 16 registers on the two double SCOM chips 12a and 12b. Each register can store up to 16 digits, each of which has four bits, of course.

Registers 1–8 and 12, as well as digits 1 and 2 in register 13 are reserved for hierarchy control, although registers 1–8 may be addressed from the second ROM using the aforementioned hierarchy address program code.

Register 0 is reversed for: (1) ten user flags, (2) the RAM/Constant ROM Program Counter and Program Source Flag, (3) last key entry and (4) a fixed point display indicator. The Program Source Flag in digit 3 and the digit 15 flag in Register B 53b (FIG. 3a) define where calculator control is to be passed after the present set of instruction words from first ROM 20 are executed. If flag B 15 is set, then the calculator is under control of a program either in (1) RAM's 14a–d, (2) second ROM 48 or (3) the second ROM portion of the constant ROMs on double SCOM chips 12a or 12b. If flag B 15 is reset, the calculator is under normal keyboard control. The program Source Flag is a 0 if control is to be returned to RAM 14a–d area; a 1 through 7 if control is to be passed to second ROM chip 48′; or an 8 or 9 if control is to be passed to the constant ROM area.

Registers 14 and 15 are utilized to permit superroutining of the programs in RAMs 14a–d or in second ROM chip 48′. Thus after control passes to the element specified by the current program control flag, the stack implemented by registers 14 and 15 is popped and the location and new program control flag previously in level one thereof is inserted into digits 7–3 of register 0. Of course, when the number of superroutine levels in the stack is one or greater, as indicated by the number in digit 0 of register 15. The stack is pushed (i.e., another level of superroutining is added) when (1) a function stored in the constant ROM area (e.g. P→R) is encountered; (2) a label is encountered (e.g. A-E or A′-E′); (3) a subroutine program code or key depression followed by either a three digit address or a non-numeral label address (which initiates either a branch or a label search in the element presently controlling operation and if the second ROM chip 48′ is the controlling element, the label search is limited to the present page); or (4) program codes or key depressions for 2ND, PGM, and then A-E′ or SBR and label (e.g. SBR X$^2$ or SBR =) or SBR and a three digit relative address (initiating either a label search on the indicated page or a branch to a specific program code on that page whose address is determined by adding the relative address to the address of the first program code on that page). As can be see, six levels of such routines may be employed in this embodiment, with digit 0 if Register 15 indicating the number of levels actually being utilized at any given time.

Register 13 stores the addresses of the useable data storage area in RAMs 14a–d, which may be varied or reconfigured by the operator inputting appropriate OP codes, as previously mentioned. Digit 0 of register 13 contains a flag indicating whether angular results are to be provided in degrees, radians or grads.

Register 11 is used as the T register, for the comparisons made in the "conditional go to" program codes, while register 10 stores eight program codes during operations under RAM 14a-d or constant ROM control, at which time the eight programs stored in a constant area or register in RAM being accessed are temporarily stored in register 10 to simplify the extraction of the program code to be used to address first ROM 20.

Register 9 contains the old and new page numbers which allows the user to change pages easily. Register 9 also contains information about the program size, size of the RAM and also the magnetic card security code, which is read from magnetic cards, as aforementioned.

I have described my invention in connection with certain specific embodiments thereof. It is to be understood that modification may now suggest itself to those skilled in the art and that this invention is not limited to the specific embodiment disclosed, except as set forth in the appended claims.

TABLE III

| PROGRAM CODE | FUNCTION | KEY(s) |
|---|---|---|
| 00 | 0 | 0 |
| 01 | 1 | 1 |
| 02 | 2 | 2 |
| 03 | 3 | 3 |
| 04 | 4 | 4 |
| 05 | 5 | 5 |
| 06 | 6 | 6 |
| 07 | 7 | 7 |
| 08 | 8 | 8 |
| 09 | 9 | 9 |
| 10 | $E^1$ | 2nd, E |
| 11 | A | A |
| 12 | B | B |
| 13 | C | C |
| 14 | D | D |
| 15 | E | E |
| 16 | $A^1$ | 2nd, A |
| 17 | $B^1$ | 2nd, B |
| 18 | $C^1$ | 2nd, C |
| 19 | $D^1$ | 2nd, D |
| 20 | Clear | 2ND, CLR |
| 21 | 2nd | 2nd |
| 22 | Inverse Function | INV |
| 23 | LNX | LNX |
| 24 | Clear Entry | CE |
| 25 | Clear | CLR |
| 26 | 2nd | 2nd, 2nd |
| 27 | Inverse Function | 2nd, INV |
| 28 | log | 2nd, log |
| 29 | Clear Program | 2nd, CP |
| 30 | Tangent | 2nd, TAN |
| 31 | Learn | LRN⇌T |
| 32 | Exchange display and T register | X⇌ |
| 33 | $X^2$ | $X^2$ |
| 34 | $\sqrt{x}$ | $\sqrt{x}$ |
| 35 | 1/X | 1/X |
| 36 | Program Page | 2nd, PGM |
| 37 | Polar to Rectangular | 2nd, P→R |
| 38 | Sine | 2nd, Sin |
| 39 | Cosine | 2nd, COS |
| 40 | Indirect Addressing | 2nd, IND |
| 41 | Single Step | SST |
| 42 | Store in Memory # | STO |
| 43 | Recall from Memory # | RCL |
| 44 | Sum into Memory # | SUM |
| 45 | $Y^x$ | $Y^x$ |
| 46 | Insert Program Code | 2nd, INS |
| 47 | Clear Memories | 2nd, CMs |
| 48 | Exchange Display and Memory # | 2nd, EXC |
| 49 | Multiply Display into Memory # | 2nd, prod |
| 50 | Absolute Value | 2nd, \|x\| |
| 51 | Back Step | BST |
| 52 | Exponent Entry | EE |
| 53 | ( | ( |
| 54 | ) | ) |
| 55 | ÷ | ÷ |
| 56 | Delete Program Code | 2nd, DEL |
| 57 | Engineering Notation | 2nd, ENG |

TABLE III-continued

| PROGRAM CODE | FUNCTION | KEY(s) |
|---|---|---|
| 58 | Fixed Point Notation | 2nd, FIX |
| 59 | Integer | 2nd, INT |
| 60 | Degree | 2nd, DEG |
| 61 | Go To | GTO |
| 62 | Indirect Program Page # | 2ND, EXT 2ND, IND |
| 63 | Exchange Indirect Memory # with display | 2ND, EXT 2ND, IND |
| 64 | Multiply Display Into Indirect Memory # | 2ND, PROD 2ND, IND |
| 65 | Multiply | X |
| 66 | Pause | 2nd, PAUSE |
| 67 | Go To # if X = t | 2nd, x = t |
| 68 | No Operation | 2nd, NOP |
| 69 | Operation Code # | 2nd, OP |
| 70 | Radians | 2nd, RAD |
| 71 | Subroutine Call | SBR |
| 72 | Store in Indirect Memory # | STO, 2ND, IND |
| 73 | Recall Indirect Memory # | RCL, 2ND IND |
| 74 | Add Display into Indirect Memory # | SUM, 2ND IND |
| 75 | Minus | — |
| 76 | Lable Key | 2nd, LBL |
| 77 | Go To # if x ≧ t | 2nd, x ≧ t |
| 78 | Insert Data Point | 2nd, Σ+ |
| 79 | Mean | 2nd, $\overline{X}$ |
| 80 | Grad | GRD |
| 81 | Reset | RST |
| 82 | Hierarchy Address | Not directly accessible |
| 83 | Go to Indirect Address | GTO, 2ND IND |
| 84 | Operation Code Indirect # | 2ND, OP 2ND, IND |
| 85 | Plus | + |
| 86 | Set Flag # | 2nd, ST FLG |
| 87 | If Flag # Set, Go To # | 2nd, IF FLG |
| 88 | Degrees, Minutes, Seconds | 2nd, DMS |
| 89 | π | 2nd, π |
| 90 | List Program | 2nd, LIST |
| 91 | Run/Stop | R/S |
| 92 | Return | INV, SBR |
| 93 | Decimal Point | . |
| 94 | Change Sign | +/− |
| 95 | Equals | = |
| 96 | Write | 2nd, Write |
| 97 | Decrement Register # and Go To # when zero | 2nd, DSZ |
| 98 | Advance Paper | 2nd, PAP |
| 99 | Print | 2nd, PRT |

TABLE IV

Program codes following an heirarchy address code (82)

| FIRST DIGIT | FUNCTION |
|---|---|
| 0 | store |
| 1 | recall |
| 2 | conditional return (second digit is ignored) |
| 3 | sum into |
| 4 | multiply into |
| 5 | subtract from |
| 6 | divide into |
| 7 | " |
| 8 | " |
| 9 | " |

| SECOND DIGIT | HEIRARCHY REGISTER |
|---|---|
| 0 | no-operation |
| 1 | 1 |
| 2 | 2 |
| 3 | 3 |
| 4 | 4 |
| 5 | 5 |
| 6 | 6 |
| 7 | 7 |
| 8 | 8 |
| 9 | no operation |

TABLE V

Codes Following OP Code (69)

| CODE | MEANING |
|---|---|
| 00 | Initialize for alphanumeric printing |
| 01 | Fill far left quarter of print buffer |
| 02 | Fill next to left quarter of print buffer |

TABLE V-continued

| | Codes Following OP Code (69) |
|---|---|
| CODE | MEANING |
| 03 | Fill next to right quarter of print buffer |
| 04 | Fill far right quarter of print buffer |
| 05 | Print the buffer as filled with OPS 01-04 |
| 06 | Print display plus contents of OP 04 |
| 07 | Plot asterisk in column number contained on display register (0-19) |
| 08 | List labels |
| 09 | Download page |
| 10 | Signum |
| 11 | Variance |
| 12 | Slope, intercept |
| 13 | Correlation |
| 14 | y' |
| 15 | x' |
| 16 | See current partition RAM |
| 17 | Repartition RAM |
| 18 | If not error - Set flag 7 |
| 19 | If error - Set flag 7 |
| 20 ... 29 | Increment memory 0-9 |
| 30 ... 39 | Decrement memory 0-9 |

What is claimed is:

1. An electronic calculator system comprising:
   (a) input means for inputting numeric data and functions,
   (b) a program memory for storing a calculator program inputted at said input means,
   (c) read-only-memory for storing a calculator program,
   (d) means responsive to said input means for selectively controlling said calculator system in accordance with the calculator program stored in said program memory means or the calculator program stored in said read-only memory means,
   (e) security code means associated with said read-only-memory means for indicating by the setting thereof whether or not the program stored in said read-only-memory means is a proprietary program,
   (f) down loading means for reading a program out of said read-only-memory means and into said program memory means in response to a selected input at said input means provided the setting of said security code means indicates that the calculator program in said read-only-memory means is non-proprietary.

2. The calculator system according to claim 1, wherein input means includes a keyboard.

3. The calculator system according to claim 2, wherein said security code means includes a code stored in said read-only-memory means.

4. The calculator system according to claim 3, wherein said calculator system is installed in a case having an aperture therein for receiving a plug-in module and wherein said read-only-memory means is disposed within said plug-in module.

5. An electronic programmable calculator system having a learn mode and a run mode, said calculator system comprising:
   (a) a keyboard for inputting numeric data and functions,
   (b) semiconductor read-only-memory means for storing a calculator program, said read-only-memory means also storing a security code, the setting of which indicates whether the program stored in said read-only-memory means is proprietary or non-proprietary,
   (c) semiconductor random access memory access for storing a calculator program entered at said keyboard while said calculator system is in its learn mode;
   (d) means for loading a calculator program stored in said read-only-memory means into said random access memory means in response to a particular input at said keyboard, said loading means being effective only if said security code indicates that the program stored in said read-only-memory means is non-proprietary;
   (e) means responsive to said keyboard for selectively controlling said calculator in accordance with the program stored in said read-only-memory means or in said random access memory means when said calculator is in said run mode, and
   (f) means, for providing access to an operator of said calculator system via said loading means and said random access memory means when said calculator system is in said learn mode to the program stored in said read-only-memory means provided the setting of said security code indicates that the program stored in said memory means is non-proprietary.

6. The calculator system according to claim 5, wherein said calculator system further includes a case having a receptacle therein for removably receiving a plug-in module, said read-only-memory means being disposed within said plug-in module.

7. The calculator system according to claim 6, wherein said calculator system includes a plurality of said modules, at least one of which being removeably receivable in said receptacle at any given time.

8. The calculator system according to claim 5, wherein said providing means disables the learn mode of said calculator system when the setting of said security code indicates that the program stored in said memory means is proprietary.

9. An electronic programmable calculator system having learn and program execution modes of operation and comprising:
   (a) a keyboard;
   (b) a random access memory means for storing a calculator program entered at said keyboard when said calculator is in its learn mode;
   (c) a semiconductor read-only-memory means for storing at least one calculator program, said program including a plurality of program codes, said read-only-memory means being disposed in a module;
   (d) a receptacle for receiving said module;
   (e) means for reading out the program codes stored in said read-only-memory means;
   (f) means for controlling said calculator system in accordance with the read-out of said program codes while said calculator system is in its program execution mode;
   (g) down loading means for loading the calculator program stored in said read-only-memory means into said random access memory means in response to a preselected input at said keyboard;
   (h) means for controlling said calculator system in accordance with the calculator program stored in said random access memory means while said calculator system is in its program execution mode;

(i) program modification and examination means for modifying and examining the calculator program stored in said random access memory means, said program modification and examination means being effect while said calculator system is in its learn mode;

(j) a security code stored in said read-only-memory means for indicating that,
  (i) the calculator program stored in said read-only-memory means is a non-proprietary program when said security code is in a non-set state,
  (ii) the program stored in said read-only-memory is a proprietary program when said security code is in a set state, and (k) means for inhibiting said down loading means from loading the program from said read-only-memory into said random access memory means when said security code is in the set state.

10. The calculator system as defined in claim 9, further including:
  (a) an arithmetic unit;
  (b) a read-only-memory storing a plurality of sets of instruction words;
  (c) means for addressing said read-only-memory with program codes read out of said read-only-memory means; and
  (d) instruction word decoder means for controlling said arithmetic unit according to the instruction words addressed in said read-only-memory.

11. The calculator system as defined in claim 9, wherein said read-only-memory means includes a plurality of programs grouped sets of program and wherein the first program code stored in said read-only-memory means identifies the number of such sets and the second program code stored in said read-only-memory means is said security code.

* * * * *